(12) United States Patent
Petersen et al.

(10) Patent No.: US 11,022,347 B2
(45) Date of Patent: Jun. 1, 2021

(54) COOLING OF A FLUID WITH A REFRIGERANT AT TRIPLE POINT

(71) Applicant: Nel Hydrogen A/S, Herning (DK)

(72) Inventors: Leif Kappel Petersen, Lem St (DK); Lorentz Christian Heerup, Kgs. Lyngby (DK)

(73) Assignee: NEL HYDROGEN A/S, Herning (DK)

( * ) Notice: Subject to any disclaimer, the term of this patent is extended or adjusted under 35 U.S.C. 154(b) by 56 days.

(21) Appl. No.: 15/573,233

(22) PCT Filed: May 12, 2016

(86) PCT No.: PCT/DK2016/050128
§ 371 (c)(1),
(2) Date: Nov. 10, 2017

(87) PCT Pub. No.: WO2016/180425
PCT Pub. Date: Nov. 17, 2016

(65) Prior Publication Data
US 2018/0135896 A1 May 17, 2018

(30) Foreign Application Priority Data
May 13, 2015 (DK) .................................. 2015 70281

(51) Int. Cl.
*F25B 19/00* (2006.01)
*F25B 25/00* (2006.01)
(Continued)

(52) U.S. Cl.
CPC ............ *F25B 19/005* (2013.01); *F25B 9/008* (2013.01); *F25B 25/005* (2013.01); *F25B 49/02* (2013.01);
(Continued)

(58) Field of Classification Search
CPC ...... F25B 19/005; F25B 9/008; F25B 25/005; F25B 49/02; F25B 6/02; F25B 2309/06;
(Continued)

(56) References Cited

U.S. PATENT DOCUMENTS 5,255,523 A 10/1993 Burgers
5,715,702 A 2/1998 Strong
(Continued)

FOREIGN PATENT DOCUMENTS

CN 1743760 3/2006
CN 101275790 A 10/2008
(Continued)

OTHER PUBLICATIONS

Translation JP-2014238159-A.*
(Continued)

*Primary Examiner* — Elizabeth J Martin
(74) *Attorney, Agent, or Firm* — Cantor Colburn LLP

(57) ABSTRACT

A closed cooling system for cooling a fluid of an open fluid system including a first heat exchanger and a compressor facilitating circulation of a refrigerant in the closed cooling system, where the refrigerant facilitates providing a solid state cooling bank which is thermally coupled to the open fluid system thereby cooling fluid conducted through the open fluid system.

14 Claims, 4 Drawing Sheets

(51) Int. Cl.
*F25B 9/00* (2006.01)
*F25B 49/02* (2006.01)
*F25B 6/02* (2006.01)
*F25B 41/385* (2021.01)

(52) U.S. Cl.
CPC .............. *F25B 6/02* (2013.01); *F25B 41/385* (2021.01); *F25B 2309/06* (2013.01); *F25B 2600/0272* (2013.01); *F25B 2600/2507* (2013.01); *F25B 2600/2513* (2013.01); *F25B 2700/1931* (2013.01); *F25B 2700/1933* (2013.01)

(58) Field of Classification Search
CPC ...... F25B 2341/0661; F25B 2341/0272; F25B 2600/2507; F25B 2600/2513; F25B 2700/1931; F25B 2700/1933
See application file for complete search history.

(56) References Cited

U.S. PATENT DOCUMENTS

| | | | |
|---|---|---|---|
| 6,195,999 B1 * | 3/2001 | Arnold | ............... C01B 3/0005 60/649 |
| 6,260,361 B1 | 7/2001 | Tyree | |
| 2010/0218516 A1 | 9/2010 | Nemer | |

FOREIGN PATENT DOCUMENTS

| | | | |
|---|---|---|---|
| DE | 3004114 | A1 | 11/1980 |
| EP | 1939548 | A1 | 7/2008 |
| EP | 2539650 | B1 | 11/2014 |
| JP | 1986208494 | A | 9/1986 |
| JP | 1999014172 | A | 1/1999 |
| JP | 2001185396 | A | 7/2001 |
| JP | 2002241772 | A | 8/2002 |
| JP | 2004170007 | A | 6/2004 |
| JP | 2008224206 | A | 9/2008 |
| JP | 200923642 | | 10/2009 |
| JP | 2013015155 | A | 1/2013 |
| JP | 2013130342 | A | 7/2013 |
| JP | 2013185720 | A * | 9/2013 |
| JP | 2013185720 | A | 9/2013 |
| JP | 2014238159 | A * | 12/2014 |
| JP | 2014238159 | A | 12/2014 |
| WO | 9822764 | A1 | 5/1998 |
| WO | 2008022039 | A1 | 2/2008 |

OTHER PUBLICATIONS

Translation JP-2013185720-A.*
International Search Report for corresponding application PCT/DK2016/050128 filed May 12, 2016; dated Oct. 18, 2016.

* cited by examiner

COOLING OF A FLUID WITH A REFRIGERANT AT TRIPLE POINT

TECHNICAL FIELD

The present invention relates to a cooling system and a method using refrigerant in the solid state for cooling a fluid of an open fluid system.

BACKGROUND

Carbon dioxide has been known for many years as refrigerant in cooling systems. EP2539650 and U.S. Pat. No. 6,260,361 are both examples of cooling systems using carbon dioxide as refrigerant. Both documents describes open cooling systems with the purpose of producing carbon dioxide slush or ice for use in a cooling process of a product external to the open cooling system.

BRIEF SUMMARY

The invention relates to a closed cooling system for cooling a fluid of an open fluid system characterized in that the closed cooling system comprises a first heat exchanger and a compressor facilitating circulation of a refrigerant in the closed cooling system, wherein the refrigerant facilitates providing a solid state cooling bank which is thermally coupled to the open fluid system thereby cooling fluid conducted through the open fluid system.

According to an advantageous embodiment of the invention, the cooling bank is provided by a phase shift of the refrigerant in the first heat exchanger, preferably a phase shift from a liquid state to a solid state.

According to an advantageous embodiment of the invention, the cooling system further comprises a cooling bank enclosure, the cooling bank enclosure comprising a coolant thermally coupled to the open fluid system wherein the refrigerant facilitates a phase shift of the coolant in the cooling bank enclosure, preferably a phase shift from a liquid state coolant to a solid state coolant thereby providing the solid state cooling bank.

According to a preferred embodiment of the invention the first heat exchanger is thermally coupled to the open fluid system thereby cooling fluid conducted through the open fluid system by the at least partly solidified refrigerant located in the first heat exchanger defining the cooling bank.

This is advantageous in that the cooling bank also referred to as energy storage is then build up in the form of a solid state of the refrigerant. Further, there is a very low volume change in the phase shift from liquid to solid state which enables the first heat exchanger to comprise the energy storage in the form of refrigerant in the solid state.

The liquid to solid phase shift is advantageous in that this requires no additional storage of the refrigerant but the first heat exchanger which would be the case if the phase shift from liquid to gas was used.

It should be mentioned that also phase shift from the liquid state to the gaseous state could be used to build up the energy storage. This however would require a storage of the refrigerant in the gaseous state such as a variable size balloon like storage.

Further, the solid state of the refrigerant comprising the energy storage i.e. solid state cooling bank undergoes a phase shift back to the liquid state or gaseous state when heated. Heat may be applied or radiated to the solid state refrigerant either from the surroundings of the cooling system or from a flow of the fluid in the part of the open fluid system comprised by the first heat exchanger. Thereby the solid state refrigerant melts and turns to liquid refrigerant and when all solid state refrigerant is melted and heat further is applied to the refrigerant it changes to gaseous state. Refrigerant in the gaseous state is then removed by the compressor reducing pressure leading to phase shift of the refrigerant back to solid state and hereby is reuse of the refrigerant obtained.

The solid state refrigerant is especially advantageous in the situation where a peak cooling capacity is needed (such as e.g. when a vehicle is fueled with hydrogen) in that as long as the refrigerant is in a solid state the temperature hereof remains the same. I.e. in the situation where $CO_2$ is used as refrigerant and is in a solid state the temperature remains at the triple point temperature of approximately minus 56° C. as long as solid state $CO_2$ is present. The energy introduced by the hydrogen during the cooling of the hydrogen is converting the solid state refrigerant to liquid state refrigerant at constant temperature.

According to an advantageous embodiment of the invention, the cooling system further comprises a cooling bank enclosure, the cooling bank enclosure comprising a coolant thermally coupled to the open fluid system wherein the refrigerant facilitates a phase shift of the coolant in the cooling bank enclosure, preferably a phase shift from a liquid state coolant to a solid state coolant.

According to an advantageous embodiment of the invention the solid state coolant within the cooling bank enclosure may then function as the cooling bank. Such cooling bank provided by a coolant different from the refrigerant circulating in the closed cooling system and preferably stationary in the cooling bank enclosure may be seen either as a supplement to the cooling bank which may be provided in the first heat exchanger or as the primary cooling bank of the closed cooling system. In any event if the cooling system is provided with a cooling bank enclosure it is advantages if fluid conductor(s) of the open fluid system is passed through the cooling bank enclosure.

The closed cooling system should be understood as a system in which the refrigerant circulates without leaving the closed cooling system and thereby it is understood that the fluid of the open fluid system is not mixed in any way with the refrigerant of the closed cooling system in that it is two separate systems. It is of course noted that a closed system in the present context designates a system based on recirculation of a refrigerant thereby allowing a certain necessary amount of refilling of refrigerant, ventilation, oil separation e.g. due to activation of safety valves, pressure regulating valves, etc. Hence a small leakage of refrigerant from the closed cooling system is expected.

A significant advantage of the present system is that the applied refrigerant may both be used to obtain a certain desired temperature in the heat exchanger and at the same time be used as an energy storage.

According to an advantageous embodiment of the invention, the cooling bank is provided in the first heat exchanger and/or in the cooling bank enclosure in time periods where there is no flow of fluid through the open fluid system. This is advantageous especially when the fluid of the open fluid system to be cooled is hydrogen which is delivered to a vehicle. In this situation a high peak cooling power is needed when a refueling of a vehicle is performed.

By building up an energy storage in the form of refrigerant changing state from liquid state to solid state between two refueling of vehicles limits the need of cooling capacity of the closed cooling system. This is due to the fact that the cooling of the fluid is done at least by the energy storage (i.e. cooling capacity storage) in the form of solid state refrigerant.

In addition to use of the energy storage for cooling the fluid the compressor is preferably also starting to remove refrigerant in the gaseous form from the first heat exchanger thereby trying to maintain the energy storage of solid state refrigerant or at least to keep the temperature of the liquid state refrigerant as low as possible i.e. as close to the triple point of the refrigerant as possible.

Such cooling system is very advantageous in that during times where there is no need for cooling fluid of the open fluid system, the energy storage (also referred to as cooling bank or simply storage) may by build for use when cooling again is needed. This is especially advantageous in situations where the fluid requires a high peak cooling. This is because then cooling capacity from the cooling bank can be used which reduces the need for high capacity cooling systems including very large and expensive compressors.

To facilitate a desired (peak) cooling capacity the volume of the refrigerant, compressor capacity of the cooling system and inertia of the refrigerant (and the physical cooling system such as mass of the vessel containing the refrigerant) has to be balanced. The present invention is advantageous in that by using refrigerant in the solid state, the volume of the refrigerant and the compressor capacity is significantly reduce compared to prior art systems (not using refrigerant in a solid state) leading to a smaller foot print of the cooling system.

Using Carbon Dioxide as refrigerant is advantageous when cooling hydrogen to a temperature of minus 40° C. in that its solid state temperature is close to minus 56° C. providing a good heat transfer also at the hydrogen discharge of the heat exchanger.

Building up the energy storage is done by controlling the closed cooling system in a way which facilitates transformation of the refrigerant into its solid state. Hence the energy storage is physically refrigerant in its solid state. The energy storage has reached its full storage capacity when all refrigerant is transformed from its liquid state to its solid state and the first heat exchanger therefore only comprising refrigerant in its gaseous and solid state.

The open fluid system should be understood as a system where a fluid enters the system at an inlet of the system preferably a fluid storage and leaves the system at an outlet preferably via nozzle or the like.

According to an advantageous embodiment of the invention, the temperature of the refrigerant at the pressure of the triple point of the refrigerant is below minus 20° C., preferably below minus 40° C. When using below here it should be understood as colder than.

It is advantageous to have a triple point temperature which is lower but still close (e.g. within 5-10° C. or even 20° C.) to the desired end temperature of the fluid of the open fluid system. This is because the temperature of the energy storage is then just below desired end temperature of the fluid of the open fluid system and therefore there is no need for using energy on cooling the refrigerant further than 10-20° C. below this temperature.

Further, the fluid of the open fluid system is preferably cooled to a temperature below minus 30° C. (colder than) by a refrigerant having a triple point above minus 70° C. (warmer than). Again, this is advantageous in that only a minimum of energy is used to building the energy storage in the first heat exchanger.

Further, the triple point of the refrigerant is preferably between −40° C. and −100° C. It is advantageous if the triple point of the refrigerant is in this interval since it is then close to the preferred temperature of the hydrogen when a vehicle is refueled with hydrogen. This has the effect that to build the cooling bank requires less energy compared to refrigerants having a lower triple point According to an advantageous embodiment of the invention, the refrigerant is Carbon Dioxide. Carbon Dioxide ($CO_2$) is advantageous in that its triple point is minus 56.6° C. at a pressure of 5.18 bar which is close to the preferred temperature of hydrogen when hydrogen is used to refuel a vehicle. Further carbon dioxide is advantageous in that it global warmth potential is much lower than other refrigerants and thereby more environmental friendly that these other refrigerants.

According to an advantageous embodiment of the invention, the fluid is hydrogen. Hydrogen is advantageous in that it is known as a climate friendly fuel recognized by many car manufactures and therefore hydrogen as fuel e.g. for cars, busses and the like are in use today. By implementing a cooling system for hydrogen as described in this document the hydrogen fueling stations are optimized leading to a reduced physical space requirement, facilitates decrease of refueling time and a reduction of costs of the hydrogen fueling station.

According to an advantageous embodiment of the invention, the closed cooling system comprises:
 a first heat exchanger comprising a refrigerant wherein the refrigerant is at least partly present within the first heat exchanger in a solid state and in a gaseous state,
 pressure regulating means facilitating ensuring the refrigerant is at least partly present in at last one of a liquid state, a solid state or a gaseous state, the pressure regulating means comprising
  an injection valve controlled by a level indicator, the injection valve facilitating regulating the pressure within the first heat exchanger by allowing refrigerant in the liquid state to enter the first heat exchanger, and
  a compressor controlled by a pressure indicator, the compressor facilitating regulating the pressure within the first heat exchanger by removing refrigerant in the gaseous state from the first heat exchanger,
 a third heat exchanger facilitating phase shift of the refrigerant from the gaseous state removed from the first heat exchanger by the compressor to the liquid state ready for injection into the first heat exchanger via the injection valve,
wherein the fluid to be cooled is introduced into the first heat exchanger comprised in at least one fluid conductor which is part of the open fluid system and separate from the closed cooling system.

Preferably the fluid conductor connecting a fluid storage to the open fluid system outlet is passed through the first heat exchanger of the closed cooling system. In relation to the invention the open fluid system outlet may be connectable to a vehicle. A vehicle should be understood as any kind of device which by means of a fluid is capable of moving, lifting and the like including any kind of motorized vehicle. This is especially advantageous when the fluid is hydrogen which is stored in the fluid storage and conducted via the fluid conductors The closed cooling system being separated from the fluid system should be understood as a separation of the systems comprising the fluid and refrigerant. This is done by use of two independent systems which ensures that there is no mix of the fluid and the refrigerant.

According to an advantageous embodiment of the invention, the closed cooling system is part of a fueling station. This is advantageous especially in relation to fueling (also referred to as refueling) stations or parts hereof where it is possible to refuel a vehicle with a fuel such as hydrogen preferably in the gaseous state. When e.g. hydrogen is transferred from the fueling station to the vehicle the temperature is preferably between −33° C. and −40° C. Therefore as a vehicle is refueled with hydrogen, the requirements to the cooling system are huge in that either the hydrogen storage at the fueling station should be below −33° C. Alternative from one point in time to the next the hydrogen should be brought from its storage temperature which is typically the same as the ambient temperature of the hydrogen storage to a delivery temperature at a temperature below −33° C. to avoid the total filling time to increase. By the inventive cooling system the latter is possible due to the cooling bank build in the first heat exchanger as mentioned above thereby expensive and physical large cooling systems/compressors are avoided.

According to an advantageous embodiment of the invention, the cooling capacity of the cooling system is less than the cooling capacity needed at the peak T1, T4 requirement at a refueling of a vehicle. This is advantageous in that hereby costs are reduced to a cooling system for a fueling station and by using a cooling system as described providing an energy storage this cooling system is still able to comply with peak requirements during refueling of a vehicle.

According to an advantageous embodiment of the invention, the flow of fluid through the open fluid system is terminated if the temperature of the fluid conducted through the fluid conductor between the first heat exchanger and the outlet of the open fluid system drops below a predefined threshold value. This is advantageous in that this ensures that the temperature of the fluid out of the open fluid system is at least at the predefined threshold value. This threshold value is preferably minus 32° C. or colder in the situation where the fluid is hydrogen delivered from the open fluid system to a vehicle.

According to an advantageous embodiment of the invention, the fluid conductor is implemented in the first heat exchanger or in the cooling bank enclosure as a tube or plate, preferably a plurality of parallel tubes within the first heat exchanger. A tube should be understood as any type of tubular shaped fluid conductor including a tubular shaped fluid conductor formed as a spiral to increase the surface of the fluid conductor which is in contact with the cooling fluid. Plates should be understood as fluid conducting plates in the interior of which ducts for the fluid may be present.

In the preferred embodiment a plurality of fluid conductors are used in parallel these parallel installed fluid conductors may then be connected to a common fluid conductor outside the first heat exchanger e.g. in or via a manifold. As an alternative the plurality of fluid conductors are connected in series.

According to an advantageous embodiment of the invention, the closed cooling system further comprises a second heat exchanger precooling the fluid. This is advantageous in that in this second heat exchanger the fluid is cooled e.g. from storage temperature of e.g. 20° C. to a temperature of −5° C. to −10° C. Then the first heat exchanger does not have to cool the fluid so much as in the case where the second heat exchanger was not present. This is advantageous in that the first heat exchanger is often more expensive in terms of energy consumption to use than the second heat exchanger in that the first heat exchanger lowers the temperature down to about minus 56° C. when the refrigerant is Carbon Dioxide.

According to an advantageous embodiment of the invention, the third heat exchanger is located at a level in the cooling system higher than the first heat exchanger and the second heat exchanger. This is advantageous in that liquefied refrigerant from the third heat exchanger then by means of gravity is supplied to at least the first or second heat exchanger. The third heat exchanger may be a traditional heat exchanger which does not directly cool the fluid from the open fluid system rather it is lowering the temperature of the of the refrigerant by condensing the gaseous state to the liquid state.

According to an advantageous embodiment of the invention, the cooling system further comprises a temperature dependent valve facilitating mixing the fluid from the second heat exchanger or from the storage with fluid from the first heat exchanger or from the cooling bank enclosure to obtain a predefined temperature of the fluid at an outlet of the open fluid system. When the refrigerant of the first heat exchanger is mainly in the solid state (and in the gaseous state) it may be cooling the fluid below the desired temperature and therefore it is advantageous to mix the fluid cooled by the first heat exchanger with gaseous fluid e.g. from the second heat exchanger to obtain the desired temperature of the fluid.

Preferably this temperature is warmer than minus 40° C. and at least when the fluid from the open fluid system outlet is mixed with fluid of a receiving storage preferably of a vehicle, then the temperature of the fluid in this vehicle fluid storage is between 85° C. and minus 45° C. at all times, preferably between minus 20° C. and minus 40° C.

This is especially advantageous when the fluid is hydrogen which is to be used as fuel to a vehicle in that at this temperature hydrogen is present in the liquid state. Further, the behavior of commonly used materials such as steel and carbon is normal when the temperature is above minus 40° C. (warmer than). Therefore it is advantageous to stay above this temperature to be able to use common material without special material properties neither in the open fluid system nor in systems coupled hereto. Because no additional requirements to material are needed commercial available valves, vessels, etc. may be used.

According to an advantageous embodiment of the invention, the pressure of the first heat exchanger is regulated by the compressor on the basis of pressure measurements made within the closed cooling system, preferably within the first heat exchanger.

This is advantageous in that the energy storage is build when the pressure of the first heat exchanger is at or below the triple point of the refrigerant. As an alternative the compressor may also be controlled by a pressure measurement for the refrigerant between the compressor and the first heat exchanger Moreover the invention relates to a method for cooling a gaseous fluid comprised by an open fluid system connectable to a vehicle, the gaseous fluid being conducted through a closed cooling system in fluid conductors, the closed cooling system comprising a refrigerant suitable for cooling at least part of the fluid conductor comprising the gaseous fluid, the closed cooling system comprising at least a first heat exchanger and a compressor, the method comprising the steps of:

creating refrigerant in the solid state within the closed cooling system by starting the compressor when either: a flow of the gaseous fluid from the open fluid system to the vehicle is registered, or when a predefined period of time has elapsed since the pressure in the first heat exchanger exceeded the pressure of the triple point of the refrigerant, or when a predetermined time since the last compression cycle has elapsed.

According to an embodiment of the invention, the compressor is stopped when the pressure in the first heat exchanger is below the pressure of the triple point of the refrigerant, or when a predetermined time has elapsed since the last compression cycle, or when a predetermined amount of ice is detected in the first heat exchanger.

The compression cycle referred to above is simply understood as when the compressor is running and changing pressure in the first heat exchanger. The compression cycle may be controlled a controller getting input from pressure, flow or temperature transducers. In addition, sensors for detection ice fraction or ice level in the first heat exchanger may also provide input to the control of the compressor. In addition, times of the controller may also be part of the operation of the compressor i.e. starting and stopping the compressor cycles.

It is advantageous to aim at a solid state of the refrigerant in the first heat exchanger in that in this way a cooling bank is created which facilitates cooling the gaseous fluid during peak load. Peak load could e.g. be when a vehicle is refueled with the gaseous fluid.

When a vehicle is being refueled heat in the form for non-cooled gaseous fluid is passed through the first heat exchanger in the fluid conductor resulting in a melting of the solid state refrigerant. Therefore it an advantageous starting condition for the compressor is when gaseous fluid flows through the fluid conductor.

Heat from the surroundings of the first heat exchanger will over time increase the heat inside the first heat exchanger and thereby melt the solid refrigerant. Therefore it is advantageous to start the compressor when a certain period of time has elapsed to increase the cooling capacity of the first heat exchanger (cooling bank). The period of time is depending on the heat entering the closed cooling system melting the solidified refrigerant and thereby the insulation of the heat exchanger. Therefore the period of time is adjusted according to the environment surrounding the cooling system and may even be the result of a mathematic formula taking environmental measures, time since last stop of the compressor etc. into account in calculating the time. Hence this time may vary from a few hours to three or more days.

When the pressure in the first heat exchanger becomes lower than the pressure of the triple point of the refrigerant this indicates that all refrigerant in the liquid state is solidified. The more refrigerant in the solid state the higher cooling capacity is stored in the first heat exchanger (cooling bank) but at a pressure below the triple point pressure no more refrigerant liquid is present to solidify and therefore the compressor is stopped. It could be relevant to wait with stopping the compressor if lower temperature of the solidified refrigerant is desired, but this will depend on the desired or necessary cooling capacity of the first heat exchanger (cooling bank).

According to an advantageous embodiment of the invention, the temperature of the refrigerant at the pressure of the triple point of the refrigerant is below minus 20° C., preferably below minus 40° C. When using below here it should be understood as colder than.

According to an advantageous embodiment of the invention, the refrigerant is Carbon Dioxide. Carbon Dioxide is advantageous in that the temperature at the triple point is −56.6° C. at a pressure of 5.18 bar which matches the preferred temperature of hydrogen as gaseous fluid when used for refueling a vehicle. The preferred temperature is between −33° C. and −40° C.

According to an advantageous embodiment of the invention, the compressor is operated in a discontinued mode determined by a pressure threshold of the pressure within the first heat exchanger. This is advantageous in that the energy consumption of the compressor is limited to two situations 1) where there is a flow of fluid in the open fluid system and 2) when the pressure within the first heat exchanger is above a threshold pressure.

Preferably the pressure threshold is the pressure of the triple point of the refrigerant used in the closed cooling system and wherein the compressor is stopped when the pressure within the first heat exchanger is below this triple point pressure.

This is advantageous in that when pressure of the first heat exchanger is below the triple point the refrigerant of the first heat exchanger is in its solid state. This is at least true when the refrigerant is carbon dioxide.

Moreover the invention relates to the use of a cooling bank comprising a solid stated compound for cooling hydrogen in a hydrogen fueling station According to an advantageous embodiment of the invention the compound is a solid state refrigerant.

According to an advantageous embodiment of the invention the compound is a solid state coolant.

According to an advantageous embodiment of the invention the hydrogen fueling station comprises a closed cooling system and is controlled according to a method as described herein.

This is advantageous in that the gaseous fluid in the specific case of hydrogen is then at a desired temperature for fueling into a vehicle.

Moreover the invention relates to a hydrogen fueling station comprising:
  a hydrogen storage, and
  hydrogen conductor connecting the hydrogen storage to a hydrogen outlet, wherein the hydrogen conductor is at least partly temperature controlled by means of solid state refrigerant.

This is advantageous in that the hydrogen in the hydrogen conductor is then cooled to the temperature of the solid state refrigerant, the refrigerant being chosen to have a solid state temperature at or below the desired temperature of the hydrogen at the hydrogen outlet. The hydrogen outlet is preferably in the form of a nozzle suitable for connecting the hydrogen conductor to a vehicle and is cooled as it flows from the hydrogen storage to the outlet.

According the this embodiment the fluid mentioned is hydrogen and hence where fluid is used in this document it may be replace by hydrogen i.e. where this document describes fluid this should preferably be understood as hydrogen in relation to this and the following embodiments.

It is advantageous to only temperature regulate preferably cool the hydrogen conductor to obtain a desired temperature of the hydrogen and preferably only in the first heat exchanger. The alternative to this is to cool hydrogen at the hydrogen storage, which would require a much higher energy consumption, insulation requirements to the storage, etc. as compare the temperature control mentioned above.

According to an advantageous embodiment of the invention, the hydrogen fueling station further comprises an automatic solid refrigerant generator producing solid refrigerant, the automatic solid refrigerant generator comprising a first heat exchanger comprising a refrigerant for cooling the hydrogen a compressor for regulating pressure in the first heat exchanger thereby providing at least part of the refrigerant in the solid state pressure indicator for indicating pressure of the solid refrigerant generator hydrogen dispenser for measuring properties of flow of hydrogen leaving the hydrogen fueling station.

It should be mentioned that the solid refrigerant generator may be referred to and comprise the same features as the closed cooling system describe in this document. Properties measured by the hydrogen dispenser may be quantity of hydrogen fueled to a vehicle refueled from the hydrogen fueling station, cost of hydrogen, temperature of hydrogen, pressure of the hydrogen storage of the vehicle, etc.

Automatized should be understood as when measurements indicates that the refrigerant in a liquid state is present in the first heat exchanger the automatic solid refrigerant generator is automatic starting to produce refrigerant in the solid state.

It is advantageous to produce solid state refrigerant at the station in that in this way it is always present when needed for cooling in relation to refueling of vehicles. This is in contrary to import of solid state refrigerant to the station from external solid refrigerant generators.

According to an advantageous embodiment of the invention, the solid refrigerant is at least partly produced when there is no flow of hydrogen in the hydrogen conductor.

Preferably, the hydrogen fueling station further comprises an electrolyze for producing hydrogen locally at the fueling station.

Preferably, the fueling station comprising additional measuring equipment and data processing units for controlling the hydrogen fueling station. By measuring equipment is understood equipment for measuring temperature, pressure, leakage, etc.

By data processing units is understood e.g. microprocessors or logic circuits which by inputs from the fueling station is able to produce outputs for controlling the filing station. This includes controlling the production of solid state refrigerant, operation of compressor, outlet, dispenser, flow, storage, heat exchangers, etc.

Preferably, the outlet of the hydrogen fueling station is connectable to a vehicle.

BRIEF DESCRIPTION OF THE DRAWINGS

In the following, a few exemplary embodiments of the invention are described with reference to the figures, of which

DETAILED DESCRIPTION

Figure 1A:
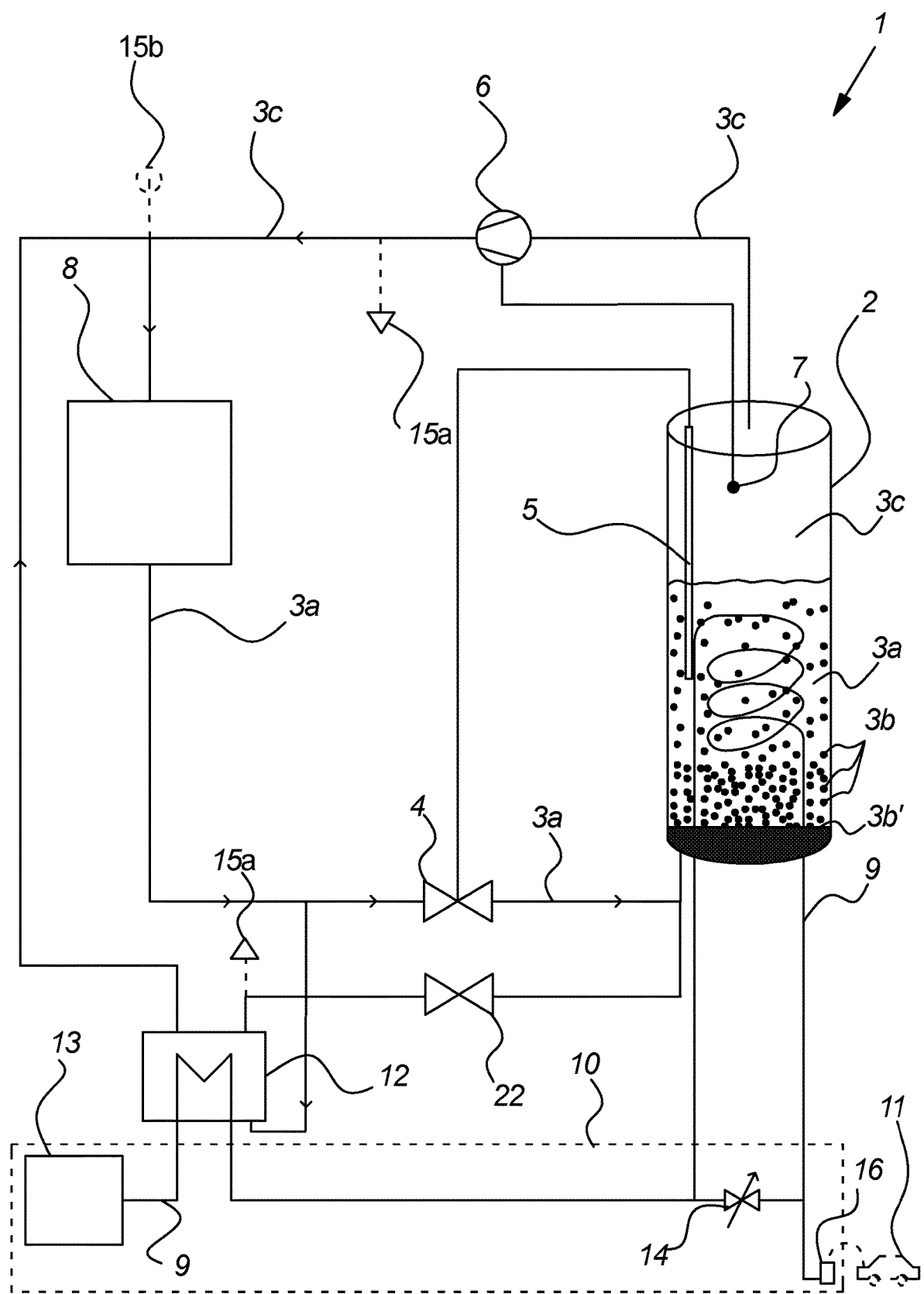
FIG. 1a illustrates a closed cooling system for cooling a fluid of an open fluid system according to an embodiment of the invention.

FIG. 1a illustrates a closed cooling system 1 according to the invention. The closed cooling system 1 comprises a first heat exchanger 2 and a compressor 6 circulating a refrigerant 3 in the closed cooling system 1. The pressure within the first heat exchanger 2 is preferably around the triple point of the refrigerant 3 and is controlled by the compressor 6 circulating the refrigerant 3 in the closed cooling system 1 by suction of gaseous refrigerant 3c out of the first heat exchanger 2.

At the triple point the refrigerant 3 is present in three phases namely the liquid 3a, the solid 3b and the gaseous 3c state. The preferred refrigerant 3 according to this invention is carbon dioxide the triple point of which is at minus 56.6° C. (Celsius) at 5.18 bar. This means by regulating the pressure of the vessel (according to this invention, the first heat exchanger 2) comprising the carbon dioxide the state of the carbon dioxide can be changed. This is a well-known property of any refrigerant 3 and is therefore know by the skilled person and will not be describe further in this document. Other refrigerants with appropriate triple point may be used as an alternative to carbon dioxide. Fluid such as hydrogen cooled by cooling banks made from such refrigerants may be temperature regulated e.g. by mixing with fluid directly from the fluid storage 13.

As mentioned, the compressor 6 is regulating the pressure of the first heat exchanger 2 by sucking out carbon dioxide in the gaseous state 3c from the first heat exchanger 2. This reduces the pressure within the first heat exchanger 2 leading to a transformation of refrigerant in the liquid state 3a to refrigerant in the solid state 3b. The fact that the temperature of solid state carbon dioxide is lower that the liquid state carbon dioxide (below the triple point pressure) is used to create an energy storage in the form of solid state carbon dioxide 3b within the first heat exchanger 2. This energy storage is physically transformed into a block of carbon dioxide ice also referred to as dry ice or $CO_2$ ice at the lower part of the first heat exchanger 2 when the energy storage is completed. A non-completed energy storage 3b' is illustrate in FIG. 1a as an refrigerant ice block however the refrigerant 3 close to the triple point temperature before all is in the solid state may also be referred to as energy storage.

As illustrated on FIG. 1a the fluid conductor 9 of an open fluid system 10 enters the first heat exchanger 2 extending through the energy storage, the part which is frozen 3b having a temperature (ideally) at minus 56.6° C. Hence when fluid of a temperature higher than minus 56.6° C. is circulating the fluid conductor 9 heat from the fluid is exchanged with cold from the energy storage. The fact that some of the carbon dioxide is in the solid state indicates that the liquid not yet turned to solid form is close to minus 56.6° C. hence the liquid part of the carbon dioxide will also have a cooling effect on the fluid.

The fluid conductor 9 both with in the heat exchangers and outside is preferably made of stainless steel of a tubular shape, but other in the art well known alternatives could also be used. The requirement to the total surface of the fluid conductor 9 in the heat exchanger 2 is defined from the temperature difference between the refrigerant (e.g. carbon dioxide of a temperature about minus 56° C.) and the fluid (e.g. hydrogen of a temperature about minus 10° C.). To avoid problems with pressure reduction in long fluid conductors 9 the required surface may be divided between several parallel fluid conductors 9 loops within the first heat exchanger 2 (note that only one loop is illustrated in the figures). Preferably the entire fluid conductor in the first heat exchanger 2 is below the surface of the part of the refrigerant which is in the liquid 3a or solid state 3b. This is advantageous in that this is leading to an optimized heat/cool exchange between the fluid in the fluid conductor and the refrigerant. However, having the refrigerant 3 in the solid state increases the risk of clocking and thereby blocking the flow of refrigerant in the cooling system. This risk should be compare to the described advantages which in situations may trump this risk.

As indicated, as the pressure drops towards the pressure of the triple point the carbon dioxide the carbon dioxide in the first heat exchanger 2 gradually turns from liquid state 3a to solid state 3c via a slush-icy phase. Hence energy storage according to this invention should be understood as refrigerant 3 which is cooler than the fluid of the open fluid system 10 no matter the if the state of the refrigerant 3 is liquid 3a, solid 3b, gaseous 3c or changing from one of these states to the other.

Therefore no matter the state of the carbon dioxide, carbon dioxide kept at a pressure close to its triple point will be able to exchange cold to a fluid comprised by an open fluid system 10 that enters the first heat exchanger 2 via the fluid conductor 9 (given of course that the fluid is above the temperature of the carbon dioxide).

According to a preferred embodiment of this invention the pressure (and thereby temperature) of the refrigerant 3 is kept close to the triple point and therefore the refrigerant 3 is at least partly present within the first heat exchanger 2 in a liquid state 3a, in a solid state 3b and in a gaseous state 3c. This is especially true when the refrigerant 3 is warmer than a fluid of the open fluid system 10 which flows through the first heat exchanger 2 in the fluid conductor 9. With this said then the when the energy storage is completely build i.e. when all the liquid state refrigerant 3a is turned into solid state refrigerant 3b only two states of the refrigerant 3 is present in the first heat exchanger 2 i.e. solid 3b and gaseous 3c state.

FIG. 1a further discloses pressure regulating means of which the compressor 6 is mentioned. In addition the pressure regulating means also comprises a level indicator 5 controlling an injection valve 4. Hence if the refrigerant 3 in the liquid state 3a or in the solid state 3b (alone or in combination) is below a predefined threshold measured by the level indicator 5, the injection valve 4 is opened. In this way refrigerant 3 preferably in the liquid state 3a is applied to the first heat exchanger 2. The level indicator 5 and the injection valve 4 is preferably conventional types for use in cooling systems, the level indicator may provide continuous level measurements.

The measurement from the level indicator 5 may be supplied to a not illustrated data processor e.g. in the form a PLC (Programmable Logic Controller; PLC) or simple logic circuits including contactors. Inputs from other sensors such as the pressure indicator 7, flow indicators, etc. may also be used as input to the not illustrated data processor. Such data processor may than process the data and provide output signals compressor, valves, outlet 16 etc. Alternatively the sensors may be connected directly to the valve, compressor, heat exchanger, etc. they provide data for and thereby these are controlled autonomously i.e. not from a controller.

The controller receives input form transducers or sensors relating to time, pressure, temperature, flow, etc. and processes these data to control the compressor, valves, pressure, temperature, flow, etc. Thereby ensuring an energy storage of solid state refrigerant capable of cooling the flow of e.g. hydrogen through the open fluid system to a desired end temperature of e.g. minus 33° C. to minus 40° C. (both included).

The controller may control the compressor including starting and stopping the compressor cycles after a predetermined time. The predetermined time may be determined based on knowledge of how fast the solid state energy storage is build (either from experiments or calculations). The time of operation the compressor may not be the same as the time the compressor is not in operation.

In the same way the predetermined level of ice in the first exchanger 2 may be determined e.g. based on knowledge of frequency of refueling and thereby needed cooling capacity or simply the desired size of the energy storage. A consideration is of the cost of building and maintain the size of the energy storage which should be balanced with the requirements of cooling the fluid of the open fluid system such as frequency of refueling.

The controller may be connected to an external data processor via a data network facilitating remotely change, operation and control of the cooling system. In the situation the cooling system is part of a hydrogen refueling station, the controller of the cooling system and the refueling station may be the same and may be controlled remotely.

Refrigerant 3 in the liquid state 3a can then be supplied to the first heat exchanger 2 from third heat exchanger 8. In a preferred embodiment the refrigerant 3 simply flows by means of gravity force from the third heat exchanger 8 to the first heat exchanger 2 due to physical location of the heat exchangers 2, 8.

Further the pressure regulating means includes a pressure indicator 7 measuring pressure within the first heat exchanger 2 or at the conductor connecting the first heat exchanger 2 with the compressor 6. When this pressure is above the triple point of the refrigerant 3 liquid state refrigerant 3a is present and the compressor 6 should be started to lower the pressure and thereby facilitate phase shift back to solid state refrigerant 3b. The pressure indicator could be any conventional manometer/pressure gangue suitable for operating at pressures around the triple point of the chosen refrigerant 3.

FIG. 1a further illustrates a second heat exchanger 12 the purpose of which is precooling the fluid for the open fluid system 10 before entering the first heat exchanger 2. The second heat exchanger 12 comprise a refrigerant 3 in the liquid state 3a which boils or vaporizes when a fluid from the open fluid system 10 enters the second heat exchanger 12 in the fluid conductor 9. The refrigerant 3 in the now gaseous state 3c is then conducted to the third heat exchanger 8.

It is advantageous to pre-cool the fluid of the open fluid system 10 in the second heat exchanger 12 in that the second heat exchanger 12 is cheap to operate compare to the first heat exchanger 2. The third heat exchanger 8 may determine the precooling factor of the second cooling system 12 but a good compromise between expenses in the cooling system is to pre-cool the fluid to a temperature of minus 10° C. to minus 15° C. Then the first heat exchanger 2 is cooling the fluid from this temperature to the desired end temperature of the fluid. The second heat exchanger 12 may be bypassed so that fluid directly from the fluid storage 13 is mixed with fluid cooled by the first heat exchanger 2 e.g. if the fluid out of the first heat exchanger 2 is colder that around minus 40° C. as would most likely be the case if carbon dioxide is used as refrigerant.

In the situation where the energy storage is complete i.e. all liquid refrigerant 3a in the first heat exchanger 2 has changed phase to solid state 3b, the fluid conducted in fluid conductors 9 will be cooled down to around minus 56.6° C. which is lower than the desired end temperature of the fluid. Therefore to obtain a desired end temperature of the fluid a temperature regulating valve 14 (or pulse controlled on-off valve) is inserted between the fluid output of the first 2 and second heat exchangers 12. By adjusting this temperature regulating valve mixing the minus 10° C. to minus 15° C. fluid with the colder than minus 40° C. it is possible to obtain a desired end temperature of the fluid. The desired end temperature of the fluid e.g. hydrogen supplied to a vehicle is between minus 33° C. and minus 40° C.

Third heat exchanger 8 is used to condense the gaseous state refrigerant 3*c* removed from the first heat exchanger 2 by the compressor 6 and/or from the second heat exchanger 12. As mentioned the now liquid state refrigerant 3*a* can now be provided to the first heat exchanger 2 via the injection valve 4. Further the liquid state refrigerant 3*a* is returned to the second heat exchanger 12. The third heat exchanger 8 could be part of any type of conventional cooling systems which therefore is not explained in further details.

According to an embodiment of the invention the third heat exchanger 8 is located (physical) above the first 2 and second 12 heat exchanger this is advantageous in that gravity is sufficient to lead liquid form refrigerant 3*a* from the third heat exchanger 8 to the first 2 (if the injection valve 5) is open and to the second heat exchanger 12.

FIG. 1*a* further illustrates additional components 15 such as additional valves 15*a* which could be implemented as safety valves or pressure regulating valves and refrigerant inlet 15*b*. If necessary the refrigerant 3 is preferably applied to the closed cooling system 1 in the gaseous state 3*c* somewhere along the lines denoted 3*c* indicating that these lines comprise refrigerant in the gaseous state 3*c*. As an alternative hereto refrigerant 3 could also be applied to the closed cooling system in the liquid form 3*a*.

The closed cooing system 1 according to the present invention at least comprises the first heat exchanger 2, the compressor 6 and the third heat exchanger 8. In addition the closed cooling system 1 may comprise pressure indicator 7, level indicator 5, additional valves 15*a*, inlets 15*b*, injection valve 4, second heat exchanger 12 and temperature regulating valve 14 and other components necessary for the normal operation of a cooling system. Further, the closed cooling system 1 may include a valve 22 controlling the pressure between the first heat exchanger 2 and the second heat exchanger 12. This pressure regulating valve 22 facilitates a stabilization of the closed cooling system 1 e.g. in situations where the load is high on the second heat exchanger 12, then the solid state cooling bank 3*b*' of the first heat exchanger 2 may then serve as an overload protection of the second heat exchanger 12 and thereby a protection mechanism of the closed cooling system as such. This is advantageous in that in this way the cooling system may actually continue cooling fluid of the open fluid system 10 in situation with no power to the closed cooling system 1.

In addition to the components of the closed cooling system 1, FIG. 1*a* also illustrates parts which together may be referred to as the open fluid system 10. The open fluid system 10 comprises a fluid storage 13, fluid conductors 9 and outlet of the open fluid system 16.

The fluid storage 13 comprising an amount of fluid which is preferably hydrogen in the gaseous state, but could in principle be any kind of fluid in either gaseous or liquid state. Such fluids would then be dictated by the application in which they are used.

As mentioned above fluid from the fluid storage 13 is pre-cooled by the second heat exchanger 12 before it is further cooled by the first heat exchanger and if necessary the output of the first 2 and second heat exchangers 12 is mixed to reach a desired temperature at the outlet 16 of the open fluid system 10. The preferred temperature at the outlet 16 is between minus 33° C. and minus 40° C. (both included) in order to be able to use conventional components/materials. Below minus 40° C. there is a risk the conventional components/materials may change behavior or properties.

An example of a more specific output temperature range could be between minus 30° C. and minus 40° C. and if the fluid is hydrogen and supplied to a vehicle 11 a preferred temperature could be minus 37° C. According to an embodiment of the invention the temperature of the fluid such as hydrogen in the fluid storage 13 is the same as the ambient temperature of the fluid storage 13. In case the fluid storage 13 is isolated then the fluid inside could be stored at a temperature below its ambient temperature. However this is not preferred in that this will require energy used to keep the stored fluid cold between refueling of vehicles 11 due to radiation from the fluid which is inevitably no matter the amount of insulation. Therefore it is preferred to provide an energy storage of the refrigerant 3 instead of storing the fluid at the temperature desired at the outlet 16.

Figure 1B:
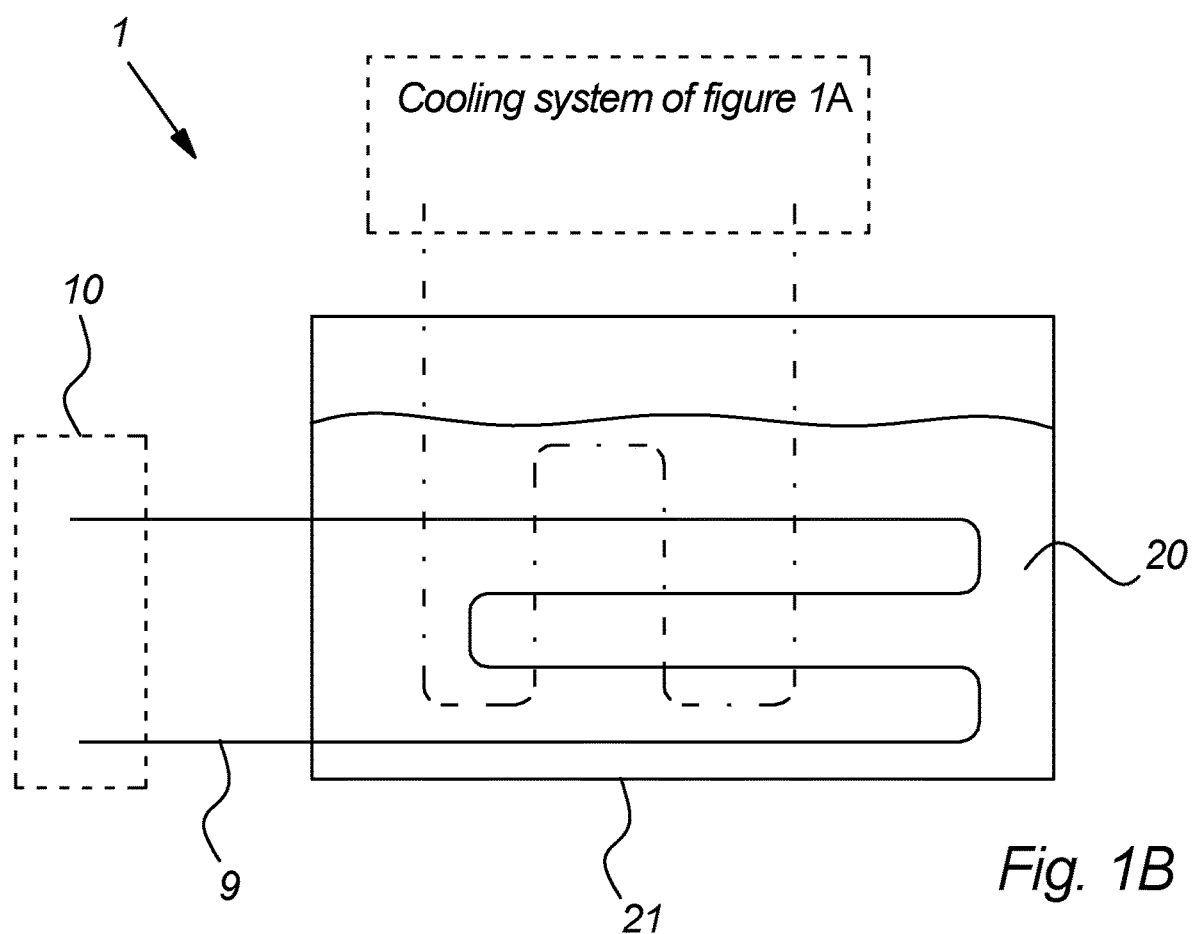
FIG. 1b illustrates a closed cooling system for cooling a fluid of an open fluid system according to an alternative embodiment of the invention.

FIG. 1*b* illustrates a cooling bank enclosure 21 connected to the cooling system 1 of FIG. 1*a* in a way where refrigerant 3 of the closed cooling system 1 is conducted through the cooling bank enclosure 21. This may be done by connecting the cooling bank enclosure 21 to one of the heat exchangers 2, 8, 12. In this way coolant 20 comprised by the cooling bank enclosure 21 is cooled by the refrigerant 3 preferably to its solid state. Thereby the a solid state cooling bank 3*b*' is provided in the cooling bank enclosure 21 by the refrigerant 3 which via fluid conductors 9 facilitates cooling of the fluid of the open fluid system 10.

The coolant could be any compound suitable for cooling the fluid of the open fluid system 10 even the same compound as the refrigerant 3 i.e. the refrigerant may also be referred to as a compound. Hence a water and salt or water and glycose solvents may be used as coolant 20. But any chemical combination suitable for obtaining a desired temperature of the coolant when solidifying and thereby turning into the solid state cooling bank 3*b*' could be used.

In using a solvent including water a change in volume happens when turning the coolant from its liquid state to its solid state. Therefore it is advantageous if the cooling bank enclosure 21 is not completely filled with coolant to leave room for this change in volume. This drawback may in some situations be overcome by the possibility of designing a coolant with an exact defined phase shift temperature from liquid to solid and thereby temperature of the solid state cooling bank 3*b*'.

It should be mentioned that the solid state cooling bank 3*b*' of the cooling bank enclosure 21 also may be provide by a simple heat exchanger i.e. a cooling system different from the cooling system of FIG. 1*a*.

Figure 2:
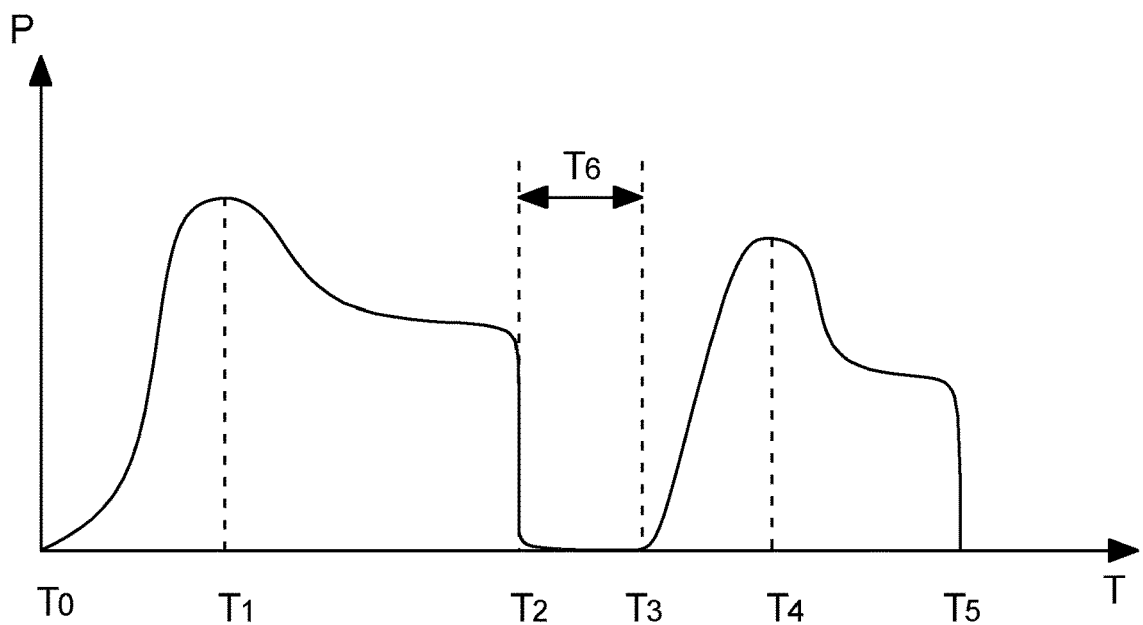
FIG. 2 illustrates power consumption in relation to refueling of a vehicle with hydrogen.

However in most cases the cooling system 1 illustrated in FIG. 1*a* is preferred where it is the refrigerant 3 itself changing to solid state and thereby providing the solid state cooling system 3*b*'. One reason for this is the minimum of change in volume of the refrigerant 3 when changing state from liquid to solid state another is the less complex system needed. In any of the described embodiments it is the triple point of the refrigerant or the coolant deciding the temperature of the solid state cooling bank FIG. 2 illustrates a refueling curve showing the cooling power (P) vs time (T) needed to cool hydrogen when a vehicle is refueled with hydrogen from a hydrogen fueling station 17 according to the invention. As can be seen the curve illustrates two refueling and from the curve the required cooling capacity peaks at time T1 and T4. These peaks illustrates an energy requirement for cooling the hydrogen down to a temperature required for refueling a vehicle i.e. a temperature which could be minus 34° C. or even lower. At these peaks this could easily be equivalent to a required cooling capacity between 60 kW and 70 kW depending on the start temperature of the hydrogen. Such capacity could be true in a situation where the hydrogen is precooled down to a temperature of about minus 10° C. e.g. by means of the second heat exchanger 12 before entering the first heat exchanger 2. After the peak the needed cooling capacity decreases until the end of the refueling process at time T2, T5. Hence in relation to the refueling process the cooling requirement stops here.

Therefore FIG. 2 illustrates in the time T0-T2 and T3-T5 cooling capacity needed from the hydrogen point of view so to speak for complying with temperature requirements when refueling vehicles. As illustrated the peak requirement peaks at times T1 and T4. At least a part of the time T6 between the refueling is necessary for provide phase shift of the refrigerant from the liquid state 3*a* to the solid state 3*b* thereby providing the energy storage 3*b*. In situations, the energy storage is capable of cooling the hydrogen to a desired end temperature without use of the rest of the cooling system including the compressor 6. In any situations where an energy storage is provided it is so to speak the energy storage of the cooling system 1 rather than the cooling system itself which is cooling the hydrogen. Hence in situations the cooling of the fluid (hydrogen) may be facilitated even when the cooling system 1 is powerless or e.g. the compressor 6 is malfunctioning e.g. not operating at full capacity. This is true for the situation where an energy storage is provided or when the compressor (or cooling system as such) is operating at a level where the time between refueling are sufficient to rebuild the energy storage i.e. change phase of refrigerant 3 from liquid to solid. The feature of the cooling system or fueling station may be increased if the first heat exchanger 2 insulated—the more insulation the better efficiency.

FIG. 2 therefore illustrates cooling requirement needed in relation to refueling of two vehicles with the time T6 between. Additional not illustrated refueling of vehicles would have substantially the same cooling requirement profile, however the peak and length may vary e.g. do to the amount of hydrogen the vehicle receives, ambient temperature and temperature of hydrogen entering the first heat exchanger 2. The time from start T0 to peak capacity is needed at T1 is typically between 20 seconds and 60 seconds. The total refueling time T0 to T2 depends mainly on ambient temperature and if this is between 20° C. and 30° C. then time T0 to T2 is typically between 3 minutes and 5 minutes. It should be mentioned that the time for refueling a vehicle may depend on the temperature of the hydrogen.

The time T6 between refueling is preferably used to prepare the energy storage in the first heat exchanger 2 for the next refueling. Preferably this is done by regulating the pressure in the first heat exchanger 2 and thereby provides a phase shift from liquid refrigerant 3*a* to solid refrigerant 3*c* and thereby providing or building an energy storage of cooling capacity within the first heat exchanger 2. This is preferably done by starting the compressor 6 either when a first refueling is terminated (stop of flow in fluid conductor 9 is measured, when increase of pressure or decrease of temperature in the first heat exchanger 2 is measured. The latter pressure and temperature change indicates that all of the refrigerant 3 of the first heat exchanger 2 is back in the liquid state 3*a* (the energy storage 3*b'* is not present any more i.e. all stored cooling capacity of the energy storage is radiated to the flow of hydrogen in the fluid conductor 9 in the first heat exchanger 2) and therefore it is time to build up the energy storage of solid refrigerant 3*b* again. It should be mentioned that the load on the third heat exchanger 8 may also have influence on the start of the compressor e.g. in a situation where the second heat exchanger provides large quantities of refrigerant in the gaseous state.

From the curve illustrated on FIG. 2 it is evident that a conventional cooling system capable of delivering the peak cooling capacity is large in dimension, power consumption and is therefore very costly. These requirements do not match well with requirements to fueling stations which are smaller in dimension, minimizing the power consumption and price with an increased capacity and high reliability. These requirements have been some of the drivers in developing the inventive cooling system described in this document which has a cooling capacity which is less than the cooling capacity needed at the refueling peaks at times T1 and T4.

In an embodiment, the cooling compressor capacity of the present invention may not comply with requirement e.g. from SAE j2601 to cool the flow of hydrogen for refueling of a vehicle without having the energy storage. Hence the capacity of the cooling system may not be enough to cool the hydrogen down the a temperature of below minus 33° C. at the peaks T1 and T4 if the hydrogen flows through the first heat exchanger in the situation where the energy storage is not built sufficiently.

The cooling system of the present invention is utilizing the time just before and after the actual refueling (flow of hydrogen in the open fluid system) to build up the solid state energy storage in preparation of the successive refueling.

Figure 3:
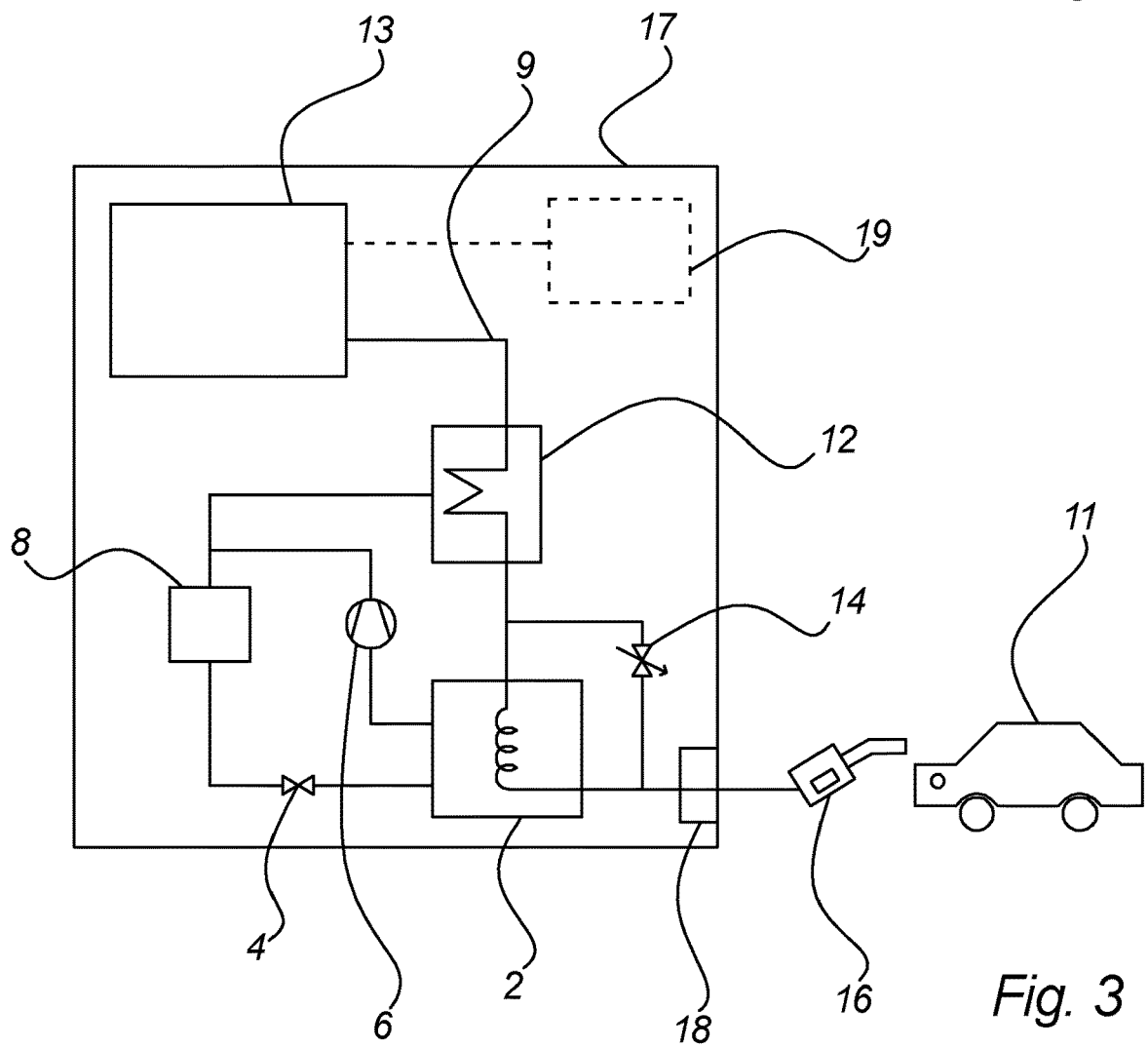
FIG. 3 illustrates a fluid fueling station according to an embodiment of the invention.

FIG. 3 illustrates a fueling station 17 according to an embodiment of the invention. The fueling station 17 may be a conventional fueling station allowing refueling of fossil fuels such as e.g. diesel and gasoline and also hydrogen or preferably a separate hydrogen fueling station 17.

The fueling station comprise an open fluid system 10 as described above comprising a hydrogen storage 13 which via hydrogen conductors 9 is in fluid connection with an outlet 16 of the open fluid system 10. The open fluid system 10 is open in that fluid is allowed to exit the open fluid system 10 in contrast to the closed cooling system 1 in which the refrigerant is not allowed to exit. Between the hydrogen storage 13 and the outlet 16 the hydrogen conductor 9 may pass through a first 2 and/or a second 12 heat exchanger and a fluid/hydrogen dispenser 18.

The purpose of the hydrogen dispenser 18 may include to measure or at least to display to the person refueling a vehicle 11 the amount of hydrogen used and e.g. also the costs of the used hydrogen.

The outlet 16 is preferably in the form of a nozzle which fits an opening to the hydrogen storage of the vehicle 11 and thereby facilitates flow of hydrogen from the fueling station 17 to the vehicle 11. The nozzle as other parts of a hydrogen fueling station 17 preferably complies with the SAE-J 2600 standard.

From FIG. 3 it is further disclosed that the fueling station 17 further discloses the closed cooling system 1 as described above. Hence the closed cooling system 1 at least includes heat exchangers 2, 8, 12 a compressor 6 and different purpose valves 4, 14. Further the fueling station 17 may comprise an electrolyze 19 enabling local hydrogen production. In addition to the components illustrated the closed cooling system (and the open fluid system 10) may also comprise not illustrated valves for regulating pressure e.g. for safety reasons, inlets and outlets e.g. for exchanging the refrigerant, etc.

Further, the cooling system 1 is mentioned above in relation to cooling fluids for driving motors of vehicles, but the cooling system 1 could also be used in other applications.

Figure 4:
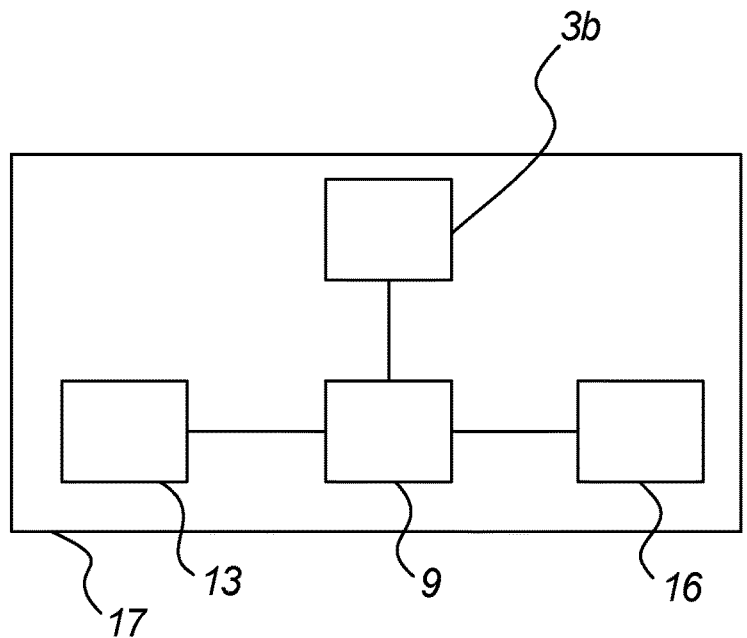
FIGS. 4 and 5 illustrates a hydrogen fueling station according to an embodiment of the invention.
Figure 5:
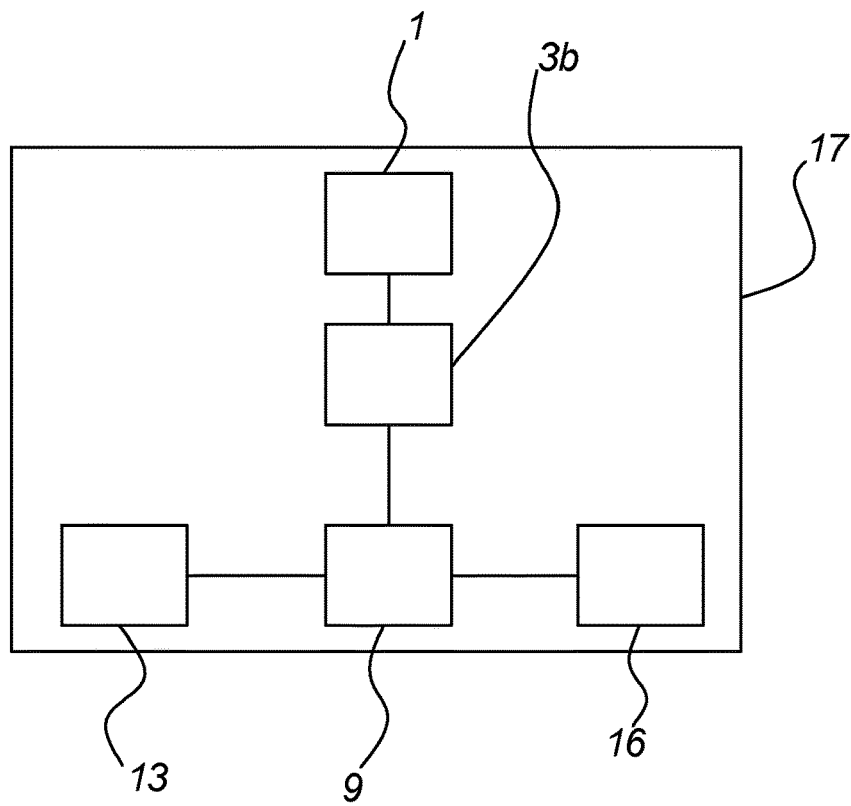

FIGS. 4 and 5 illustrates a preferred application of the inventive cooling system 1 in a hydrogen fueling station 17. Such hydrogen fueling station 17 comprising at least solid state refrigerant cooling via fluid conductor 9 hydrogen flowing from a hydrogen storage 13 to a hydrogen outlet 16.

The hydrogen fueling station 17 preferably comprising a closed cooling system 1 and an open fluid system 10 as describe throughout the document.

Generally in closed cooling systems it is not appreciated to produce refrigerant in the solid state and therefore the compressor is operating the in a way making sure that the pressure in the heat exchanger stays above the level where solid refrigerant is created. Typically the cooling system is matched with the cooling requirement from the medium to be cooled so that the flow of such medium exchange heat to the refrigerant in at a rate requiring the compressor to run continuously.

In systems for fueling for a fluid to a vehicle such cooling system is not very appropriate in that e.g. during night time there may pass long time between refueling and thereby the need of cooling capacity is not continuously. In fact as described above a fueling requires a large peak cooling capacity which most of the time i.e. when no vehicle is being refueled is being unexploited.

Further, the reason for avoiding producing refrigerant in a solid state is that there is a risk that this solid state refrigerant is being sucked out of the heat exchanger and to the compressor. If this happens this may have damaging consequences for the compressor. This risk is a drawback by using a cooling system having an energy storage made of refrigerant in the solid state and should be compared to the advantages of such system which in situations may trump this risk. The advantages of the cooling system 1 described in this document is at least that it manage to comply with high peak cooling requirements also requirements exceeding its cooling capacity (thereby reducing size and cost) e.g. in relation to refueling a vehicle 11 with hydrogen, it allows discontinued operation of the compressor 6 and thereby varying energy prices may be exploited to operate the compressor 6 when energy prices is low, the physical size and energy consumption of the cooling system is reduced compared to know cooling systems having the same cooling capacity and lifetime e.g. of compressor 6 is increased in that it does not have to start and stop as often as compressors of known cooling systems.

It should be mentioned that the cooling system and open fluid system may require data processing units for operating optimal. By data processing units is understood e.g. microprocessors or logic circuits which by inputs from the fueling station is able to produce outputs for controlling the filing station. This includes controlling the production of solid state refrigerant, operation of compressor, outlet, dispenser, flow, storage, heat exchangers, etc. The fact that no data processor are illustrated should not indicate that such are not necessary for the fueling station, cooling system and/or the open fluid system to operate.

In addition different measuring equipment could also be needed e.g. for measuring temperature, pressure, leakage, etc.

Finally it should be mentioned that the triple point properties such as pressure and temperature of the refrigerant 3 may deviate a bit from the theoretical values in the physical fueling station 17. This would mainly be due to thermal inertia in stored in conductors, heat exchangers, etc. but the overall principals of the present invention does still apply.

The invention claimed is:

1. A closed cooling system for cooling a fluid of an open fluid system, the closed cooling system comprising:
    a first heat exchanger;
    a compressor configured to facilitate circulation of a refrigerant in the closed cooling system; and
    a solid state cooling bank facilitated by the refrigerant and which is thermally coupled to the open fluid system and thereby configured to cool fluid conducted through the open fluid system, wherein the open fluid system comprises an inlet and an outlet.

2. The closed cooling system according to claim 1, wherein the cooling bank comprises a phase shift of the refrigerant in the first heat exchanger.

3. The closed cooling system according to claim 1, wherein a temperature of the refrigerant at a pressure of a triple point of the refrigerant is below minus 20° C.

4. The closed cooling system according to claim 1, wherein the refrigerant is Carbon Dioxide.

5. The closed cooling system according to claim 1, wherein the fluid is hydrogen.

6. The closed cooling system according to claim 1, wherein the first heat exchanger comprises the refrigerant wherein the refrigerant is at least partly present within the first heat exchanger in a solid state and in a gaseous state, the closed cooling system further comprising:
    an injection valve controlled by a level indicator, the injection valve facilitating regulating the pressure within the first heat exchanger by allowing refrigerant in the liquid state to enter the first heat exchanger,
    the compressor controlled by a pressure indicator, the compressor facilitating regulating the pressure within the first heat exchanger by removing refrigerant in the gaseous state from the first heat exchanger, wherein the injection valve and the compressor facilitates ensuring the refrigerant is at least partly present in at least one of a liquid state, a solid state or a gaseous state, and
    a second heat exchanger facilitating phase shift of the refrigerant from the gaseous state removed from the first heat exchanger by the compressor to the liquid state ready for injection into the first heat exchanger via the injection valve,
    wherein the fluid to be cooled is introduced into the first heat exchanger comprised in at least one fluid conductor which is part of the open fluid system and separate from the closed cooling system.

7. The closed cooling system according to claim 6, wherein the fluid conductor is implemented in the first heat exchanger as a tube or plate.

8. The closed cooling system according to claim 6, wherein the closed cooling system further comprises a third heat exchanger precooling the fluid.

9. The closed cooling system according to claim 8, wherein the third heat exchanger is located at a height in the cooling system above the height of the first heat exchanger and the second heat exchanger.

10. The closed cooling system according to claim 8, wherein the cooling system further comprises a temperature dependent valve facilitating mixing the fluid from the third heat exchanger or from storage with fluid from the first heat exchanger to obtain a predefined temperature of the fluid at an outlet of the open fluid system.

11. The closed cooling system according to claim 1, wherein the closed cooling system is part of a fueling station.

12. The closed cooling system according to claim 1, wherein the solid state cooling bank of the cooling system provides cooling capacity to the cooling system so that the cooling system can comply with the cooling capacity needed at a peak requirement at a refueling of a vehicle.

13. The closed cooling system according to claim 1, wherein the flow of fluid through the open fluid system is terminated by a valve controlled by a controller if a temperature of the fluid conducted through the fluid conductor between the first heat exchanger and the outlet of the open fluid system drops below a predefined threshold value.

14. The closed cooling system according to claim 1, wherein the pressure of the first heat exchanger is regulated by the compressor on a basis of pressure measurements made within the closed cooling system.

* * * * *